(12) United States Patent
Ito (10) Patent No.: US 8,534,828 B2
(45) Date of Patent: Sep. 17, 2013

(54) PRINTER AND METHOD FOR CONTROLLING PRINTER

(75) Inventor: Chitoshi Ito, Kasugai (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 282 days.

(21) Appl. No.: 12/886,921

(22) Filed: Sep. 21, 2010

(65) Prior Publication Data

US 2011/0074900 A1    Mar. 31, 2011

(30) Foreign Application Priority Data

Sep. 28, 2009 (JP) ................ 2009-222797

(51) Int. Cl.
*B41J 2/01* (2006.01)
*B41J 29/38* (2006.01)
*B41J 29/393* (2006.01)
*B41J 2/435* (2006.01)

(52) U.S. Cl.
USPC ............ 347/107; 347/9; 347/19; 347/247

(58) Field of Classification Search
None
See application file for complete search history.

(56) References Cited

U.S. PATENT DOCUMENTS

| | | | |
|---|---|---|---|
| 5,496,117 A * | 3/1996 | Sawada et al. | 400/61 |
| 2006/0197826 A1* | 9/2006 | Assa et al. | 347/247 |
| 2008/0055348 A1* | 3/2008 | Deeter et al. | 347/9 |

FOREIGN PATENT DOCUMENTS

| | | |
|---|---|---|
| JP | 05-229217 | 9/1993 |
| JP | 2001-67550 | 3/2001 |
| JP | 2006-044167 A | 2/2006 |
| JP | 2007-001237 A | 1/2007 |
| JP | 2007-082132 A | 3/2007 |
| JP | 2007-159008 A | 6/2007 |
| JP | 2009-122184 A | 6/2009 |

OTHER PUBLICATIONS

Partial translation of Japanese Laid-Open Patent Application Publication No. JP 2001-067550 A dated Mar. 16, 2001.
Japanese Official Action dated Jan. 29, 2013 from related application JP 2009-222797 together with English language translation.

* cited by examiner

*Primary Examiner* — Stephen Meier
*Assistant Examiner* — Alexander C Witkowski
(74) *Attorney, Agent, or Firm* — Scully, Scott, Murphy & Presser, PC (57) ABSTRACT

Operation commands, each corresponding to an input operation through an input unit, are linked together. Thereby, a single operation command string is generated from a sequence of input operations and the thus generated operation command string is recorded on a command record buffer. The recorded operation command string is converted into two dimensional bar code data and printed. The operation command string is read out from a two dimensional bar code by a bar code scanner. The operation command string thus read out is executed by a CPU etc.

5 Claims, 7 Drawing Sheets

⇩ MENU KEY

| PRINT OPTION |
|---|
| NUMBER OF COPIES |
| PAPER SIZE |
| PAGE ORIENTATION |
| PRINTING QUALITY |

⇩ OK KEY

| AUTO CUT | OFF |
|---|---|
| HALF CUT | OFF |
| MIRROR | OFF |

⇩ RIGHT-ARROW KEY ONCE

| AUTO CUT | ON |
|---|---|
| HALF CUT | OFF |
| MIRROR | OFF |

⇩ DOWN-ARROW KEY ONCE

| AUTO CUT | ON |
|---|---|
| HALF CUT | OFF |
| MIRROR | OFF |

⇩ RIGHT-ARROW KEY ONCE

| AUTO CUT | ON |
|---|---|
| HALF CUT | ON |
| MIRROR | OFF |

⇩ MENU KEY

| PRINT OPTION |
|---|
| NUMBER OF COPIES |
| PAPER SIZE |
| PAGE ORIENTATION |
| PRINTING QUALITY |

⇩ DOWN-ARROW KEY ONCE

| PRINT OPTION |
|---|
| NUMBER OF COPIES |
| PAPER SIZE |
| PAGE ORIENTATION |
| PRINTING QUALITY |

⇩ OK KEY

| NUMBER OF COPIES | 1 |
|---|---|

⇩ RIGHT-ARROW KEY ONCE

| NUMBER OF COPIES | 2 |
|---|---|

⇩ PRINT KEY

PRINTER AND METHOD FOR CONTROLLING PRINTER

CROSS REFERENCE TO RELATED APPLICATIONS

The present application claims priority from Japanese Patent Application No. JP 2009-222797, which was filed on Sep. 28, 2009, the disclosure of which is incorporated herein by reference in its entirety.

TECHNICAL FIELD

The disclosure relates to a printer including printing means capable of printing a bar code based on bar code data, as well as a method for controlling a printer including the step of printing a bar code based on bar code data.

BACKGROUND

Due to cost saving and hardware installation restriction thereof, despite various functions, conventional multifunction printers, tape printers or the like have been configured to have limited number of operation keys or a small-sized display.

When it comes to operating printers with installation restriction of user interface hardware, procedure to attain desired operation (combinations of keys to be pressed, order of pressing keys, etc.) tends to be complicated. Under the circumstances, an operator is more likely to make an error unless the operator is enough skilled. Such an erroneous operation could occur in a demonstration (hereinafter referred to as demo) at a shop for explanation of functions of the printers.

In this connection, there has been known the art of controlling an apparatus by means of bar codes so as to facilitate operations thereof. For instance, in a conventional function setting change apparatus, setting codes prepared for items corresponding to a plurality of functions are stored in advance for management, whereby a setting code corresponding to an item of which setting an operator is to change is converted into bar code information and the bar code is printed. The bar code thus printed is read as setting code by a bar code scanner equipped to the conventional apparatus so as to change the setting of function corresponding to the setting code. In consequence, the operator is not requested to input a setting code digit by digit for changing the setting of a predetermined function in the conventional apparatus.

However, as mentioned above, the conventional function setting change apparatus is configured to store, for management in advance, setting codes for respective items corresponding to different functions, wherein a user chooses a setting code pertinent to a function of which setting the user is to change, for printing. Specifically, the conventional apparatus merely converts predetermined simple operations, such as setting the item "gross sales" to "not print," or setting the item "scanner communication speed" to "2400 bps", one by one into a bar code for printing. Consequently, in case of printing bar codes for complicated operations that are combinations of various settings, such as number of copies, printing quality, page orientation etc., as well as actual printing that follows the settings thereof, by means of the art according to the conventional apparatus, it is required that many bar codes be printed and thereafter be read without sequence error, which cannot be made easy in practice.

SUMMARY

The disclosure has been made to solve the above-described problem and has an object to provide a printer and printer control method capable of facilitating the complicated operations and reducing errors in the operations.

To achieve the purpose of the disclosure, there is provided a printer comprising: a printer unit capable of printing a bar code based on bar code data; an input unit that allows an input operation; a data generator unit that generates an operation command string from a sequence of input operations by linking together operation commands each corresponding to an input operation through the input unit; a data recorder unit that records the operation command string generated by the data generator unit; and a bar-code-converter unit that converts the operation command string recorded by the data recorder unit into two-dimensional bar code data, wherein the printer unit prints a bar code based on the two-dimensional bar code data created by the bar-code-converter unit.

DETAILED DESCRIPTION

Figure 1:
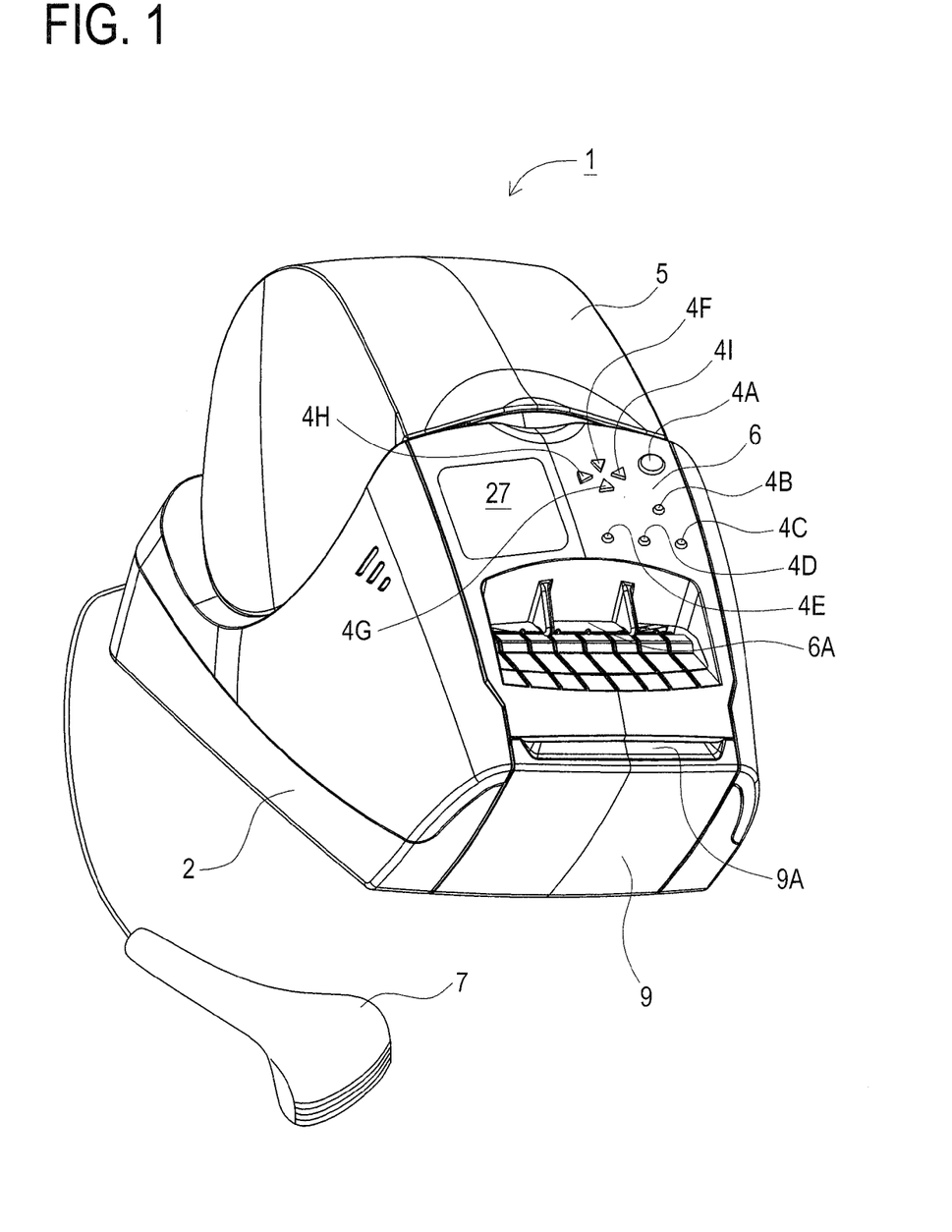
FIG. 1 is a perspective view showing an appearance of a printing apparatus directed to an embodiment as seen from a front face thereof.

A detailed description of an exemplary embodiment of a printer directed to the disclosure will now be given by referring to the accompanying drawings. As shown in FIG. 1, the printing apparatus 1 directed to the present embodiment includes a main cabinet 2 which is made of plastic and an upper cover 5 which is made of transparent plastic, the upper cover 5 being fixed to the upper rear edge of the main cabinet 2 in a freely openable manner so as to cover the upper side of the main cabinet 2. Though not shown, a roll sheet holder with a roll sheet of a predetermined width wound therearound is housed in the main cabinet 2. The roll sheet is a long, self-coloring and heat-sensitive sheet (so-called thermal paper) or a long label of which one side is a heat-sensitive sheet pasted together with a release paper by an adhesive agent. Further, though not shown, in the main cabinet 2, there is arranged a thermal head 31 (see FIG. 2) in which a predetermined number of heater elements are aligned orthogonally with respect to a conveying direction of the roll sheet. The heater elements are energized in accordance with dot pattern data stored on a print buffer 66A to be described later, whereby characters such as letters or the like are printed onto the roll sheet fed from the roll sheet holder in a manner of printing plural dot lines.

Further, a sheet ejecting port 6A for ejecting a printed roll sheet is formed in a front cover 6 located on the front side of the upper cover 5. A liquid crystal display (LCD) 27 and a key input unit 4 (see FIG. 2) are arranged on the front side above the sheet ejecting port 6A. The liquid crystal display (LCD) 27, which is controlled by a display controller (LCDC) 28 to be described later, is used for indication of various print setting screens or the like. Further, the key input unit 4 includes a print key 4A for instructing to start printing, a menu key 4B for indicating a menu selection screen, an OK key 4C for instructing to execute various processing, a cancel key 4D for canceling a setting so as to return to a previous screen, a feed-cut key 4E for ejecting the roll sheet in the conveying direction while being depressed, and keys for changing a menu or setting value, specifically, an up-arrow key 4F, a down-arrow key 4G, a left-arrow key 4H and a right-arrow key 4I.

Further, a tray member 9 is fixed to the lower edge of the front cover 6 in a freely openable manner so as to cover the front side of the front cover 6 and is configured to swing frontward to be opened by fingering a recess 9A. Further, though not shown, an inlet to be connected with a not-shown power cord and a plurality of USB (Universal Serial Bus) connectors are arranged on the rear side of the main cabinet 2. The USB connectors can be connected to a not-shown external computer while connected to a bar code scanner 7. The bar code scanner 7 is capable of reading data from a two-dimensional bar code. For instance, a CCD image sensor or the like can be taken. As the two-dimensional bar code referred to in the present embodiment, QR (Quick Response) code, etc. can be taken, for instance.

Though not shown, inside the sheet ejecting port 6A, a cutter unit consisting of a fixed blade and a movable blade is arranged, wherein the movable blade is configured to vertically move up and down with a predetermined moment by a sheet cutting motor 74 (see FIG. 2) for cutting the roll sheet to be ejected from the sheet ejecting port 6A.

Figure 2:
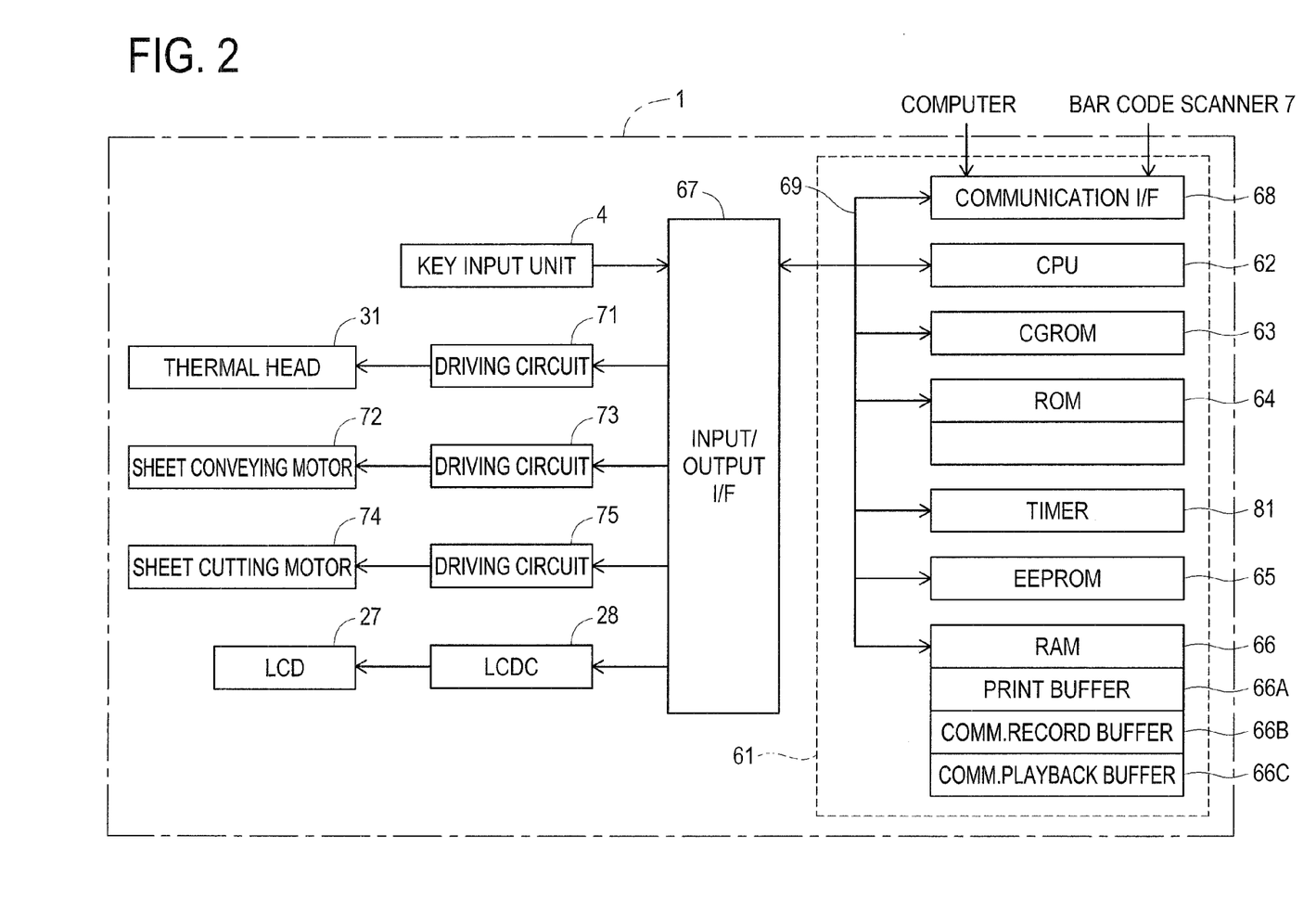
FIG. 2 is a block diagram showing a circuit configuration of the printing apparatus directed to the embodiment.

Next, there will be explained a circuit configuration of the printing apparatus 1 based on FIG. 2. As shown in FIG. 2, a control circuit unit 61, which is formed on a control board of the printing apparatus 1, includes a CPU 62, a CG (character generator) ROM 63, a ROM 64, a timer 81, a flash memory (EEPROM) 65, a RAM 66, an input/output interface (I/F) 67 and a communications interface (I/F) 68, etc. The CPU 62, the CGROM 63, the ROM 64, the flash memory 65, the RAM 66, the input/output I/F 67, and the communications I/F 68 are connected mutually by a bus line 69.

The communication I/F 68, which consists of a USB and the like for instance, is connected to the above mentioned external computer and the bar code scanner 7 by a USB cable or the like for establishing interactive data communication. Further, the CGROM 63 is a memory for character generator that stores image data such as letters or symbols to be printed as a dot pattern based on code data corresponding to the image data. Further, the flash memory 65 is a non-volatile memory that allows data write for storing therein and deletion of stored data therefrom. Specifically, the flash memory 65 stores data indicating an operator setting, etc. directed to the printing apparatus 1.

Further, the ROM 64 is designed to store various programs. Specifically, the ROM 64 stores various programs necessary for controlling the printing apparatus 1. For instance, the ROM 64 stores programs for: retrieving a key code represented by a numeral allocated to each key from an inputted key; converting each key code into each operation command represented by a character string; converting an operation command string consisting of a character string into two-dimensional bar code data; decoding the two-dimensional bar code data read by the bar code scanner 7 into an operation command string of a character string; performing various processing, such as moving a cursor to be displayed on the LCD27, etc., as instructed by input of a "other key" to be described later; and, performing the various processing as execution of each operation command. The CPU 62 carries out various calculations based on the various programs stored on the ROM 64. The timer 81 is used for measuring time.

Further, the RAM 66 is designed to temporarily store results of the various calculations carried out by the CPU 62. The RAM 66 includes various memories such as the print buffer 66A and the like. In the print buffer 66A, a dot pattern for printing of a plurality of letters, symbols, etc., and the number of application pulses representing the amount of energy for forming each dot, etc., are stored as dot pattern data. Further, the RAM 66 also includes memories of a command record buffer 66B for storing operation command strings and a command playback buffer 66C. In addition, the RAM 66 includes a storage area for storing a pointer for the command playback buffer 66C to be described later. An operation record flag for determining whether to generate an operation command string, being set to ON or OFF, is also stored on the RAM 66.

Further, for exchanging data, the input/output I/F 67 connects: the key input unit 4 for giving the control circuit unit 61 various instructions as mentioned above; a driving circuit 71 for driving the thermal head 31, a driving circuit 73 for driving a sheet conveying motor 72 for driving to rotate a not-shown platen roller; a driving circuit 75 for driving the sheet cutting motor 74; and a display controller (LCDC) 28 for controlling to drive the LCD 27. Dot patterns are stored on the print buffer 66A in the control circuit unit 61 and transmitted therefrom through the input/output I/F 67. In accordance with thus transmitted dot patterns, printing onto the roll sheet is carried out in cooperation of the thermal head 31 driven by the driving circuit 71 and the not-shown platen roller driven by the driving circuit 73 through the sheet conveying motor 72

Figure 3:
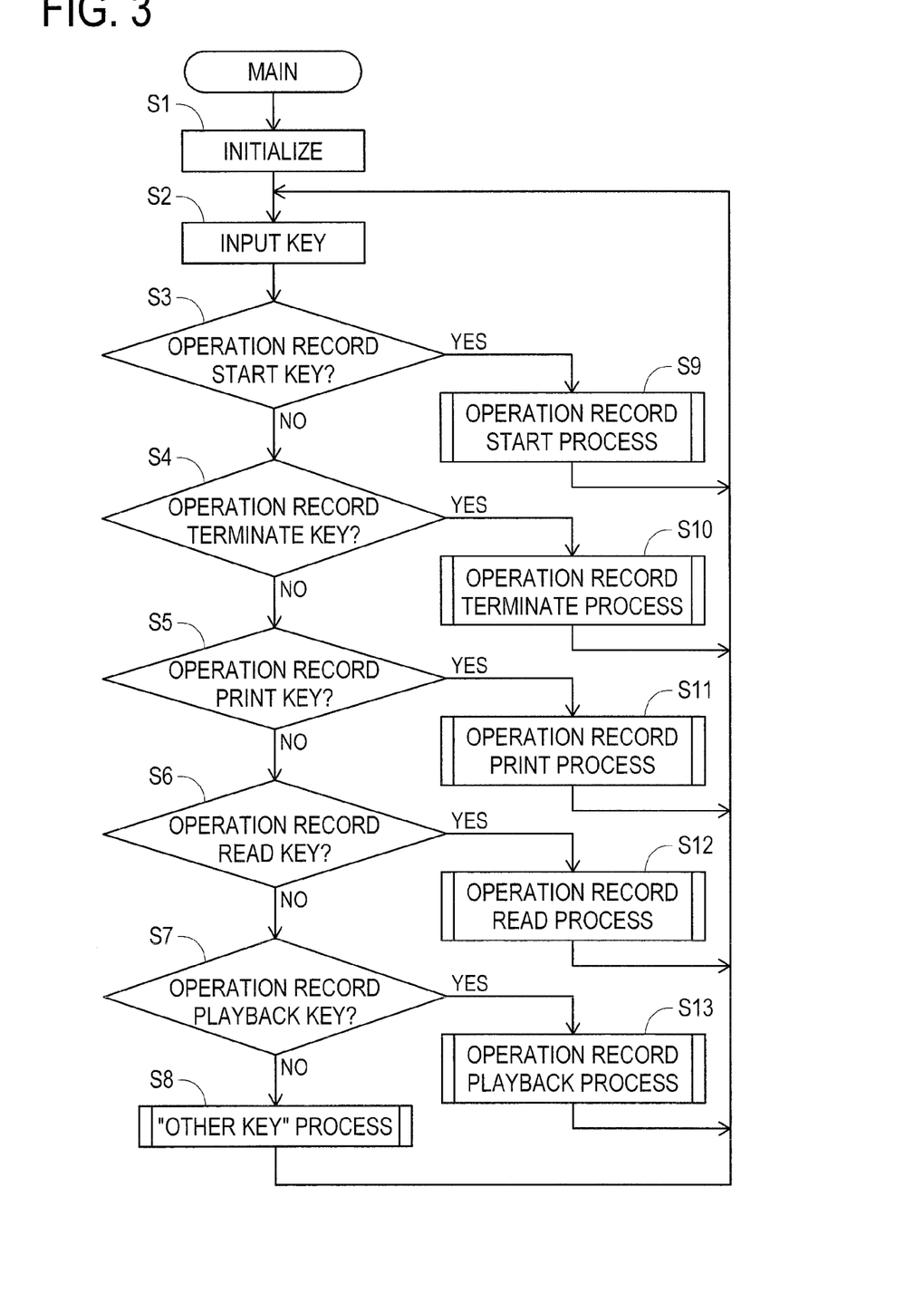
FIG. 3 is a flowchart of a main process for the printing apparatus directed to the embodiment.

Next, there will be taken a flowchart shown in FIGS. 3 through 9 as example for explaining an operation of the printing apparatus 1 in the present embodiment. The CPU 62 performs the processes below by carrying out various calculations using data stored on the RAM 66 or the like based on the programs stored on the ROM 64. First, there will be explained a main process by referring to FIG. 3. Whenever any of the print key 4A, the menu key 4B, the OK key 4C, the cancel key 4D, the feed-cut key 4E, the up-arrow key 4F, the down-arrow key 4G, the left-arrow key 4H and the right-arrow key 4I is depressed once or plural keys are simultaneously depressed once, step (hereinafter referred to as S) 2 and subsequent steps of the main process shown in FIG. 3 are repeated.

First, in S1, when power is supplied to the printing apparatus 1, the printing apparatus 1 undergoes an initialization process such as deleting what are stored on the print buffer 66A and the command playback buffer 66C, etc. The operation record flag mentioned above, being set to OFF at this initial stage, is stored on the RAM 66. Thereafter, there is waited for any key to be inputted to proceed to S3. In S3, it is judged whether or not key input operation in S2 is an instruction to start an operation record (which shall be represented by the operation of simultaneous depression of the menu key 4B and the up-arrow key 4F, for instance). In case the key input operation is judged as instruction to start the operation record (S3: YES), an operation record start process in S9 is executed (see FIG. 4). In case the key input operation is judged not as instruction to start the operation record (S3: NO), the process is proceeded to S4.

In S4, it is judged whether or not the key input operation in S2 is an instruction to terminate an operation record (which shall be represented by an operation of simultaneous depression of the menu key 4B and the down-arrow key 4G, for instance). In case the key input operation is judged as instruction to terminate the operation record (S4: YES), an operation record terminate process in S10 is executed (see FIG. 6). In case the key input operation is judged not as instruction to terminate the operation record (S4: NO), the process is proceeded to S5. In S5, it is judged whether or not the key input operation in S2 is an instruction to print an operation record (which shall be represented by an operation of simultaneous depression of the menu key 4B and the left-arrow key 4H, for instance). In case the key input operation is judged as instruction to print the operation record (S5: YES), an operation record print process in S11 is executed (see FIG. 7). In case the key input operation is judged not as instruction to print the operation record (S5: NO), the process is proceeded to S6. In S6, it is judged whether or not the key input operation in S2 is an instruction to read an operation record (which shall be represented by an operation of simultaneous depression of the menu key 4B and the right-arrow key 4I, for instance). In case the key input operation is judged as instruction to read the operation record (S6: YES), an operation record read process in S12 is executed (see FIG. 8). In case the key input operation is judged not as instruction to read the operation record (S6: NO), the process is proceeded to S7.

In S7, it is judged whether or not the key input operation in S2 is an instruction to playback an operation record (which shall be represented by an operation of simultaneous depression of the menu key 4B and the cancel key 4D, for instance). In case the key input operation is judged as instruction to playback the operation record (S7: YES), an operation record playback process in S13 is executed (see FIG. 9). On the other hand, in case the key input operation is judged not as instruction to playback the operation record (S7: NO), the process is proceeded to an "other key" process in S8. An input operation of the "other key" according to the present embodiment is referred to as any of key input operations other than instructions to start an operation record, to terminate an operation record, to print an operation record, to read an operation record and to playback an operation record.

Figure 4:
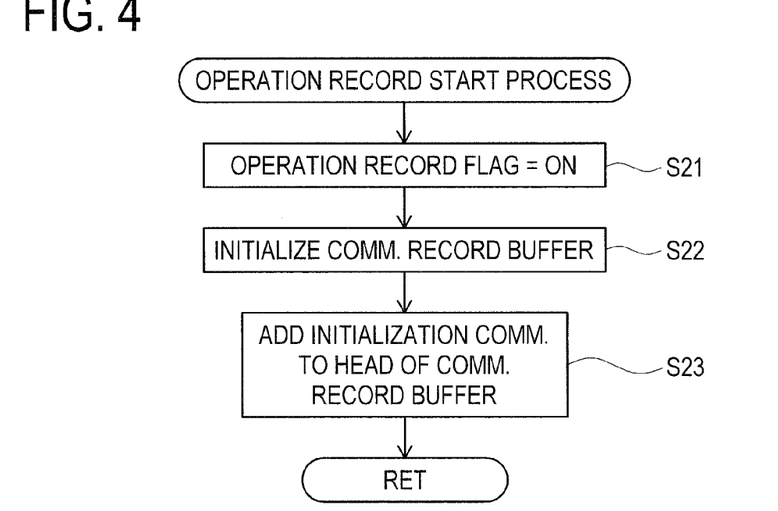
FIG. 4 is a flowchart of an operation record start process for starting generation and record of an operation command string.

Next, there will be explained the operation record start process in S9 based on FIG. 4. As shown in FIG. 4, an operation record flag is read from the RAM 66 and the thus read operation record flag is newly set to ON and stored back on the RAM 66 in S21. Next, in S22, the command record buffer 66B is initialized for deleting an operation command string last stored therein. Thereafter, in S23, an initialization command (for instance, a command consisting of a character string "@INIT") is added to the head of the command record buffer. Then, the process is returned to S2 for waiting for a next key input operation (see FIG. 3).

Figure 5:
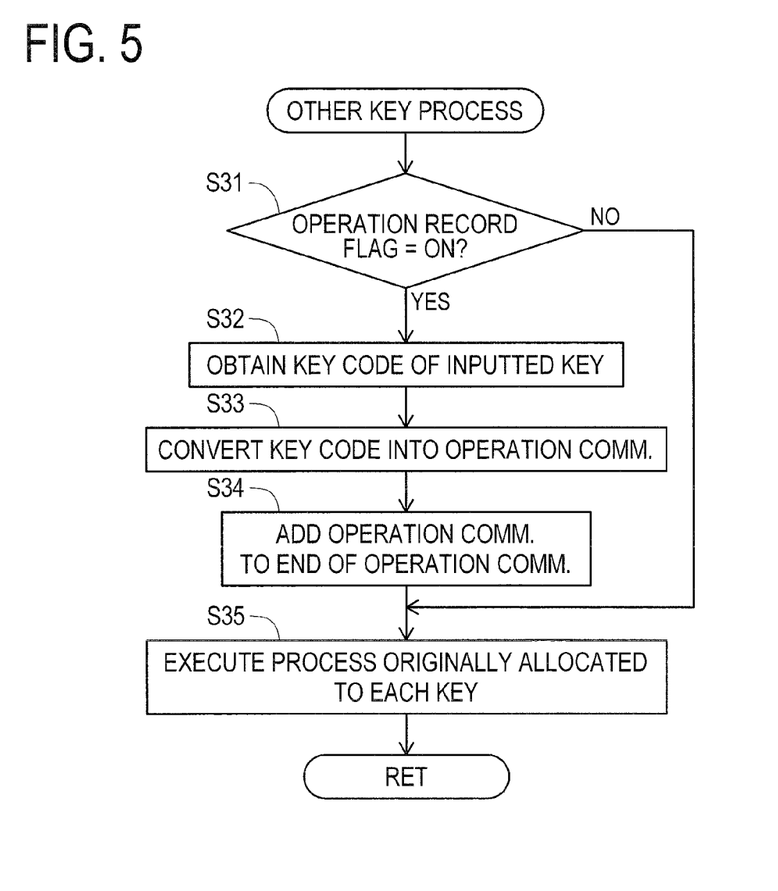
FIG. 5 is a flowchart of an "other key" process for generating and recording the operation command string.
Figure 10:
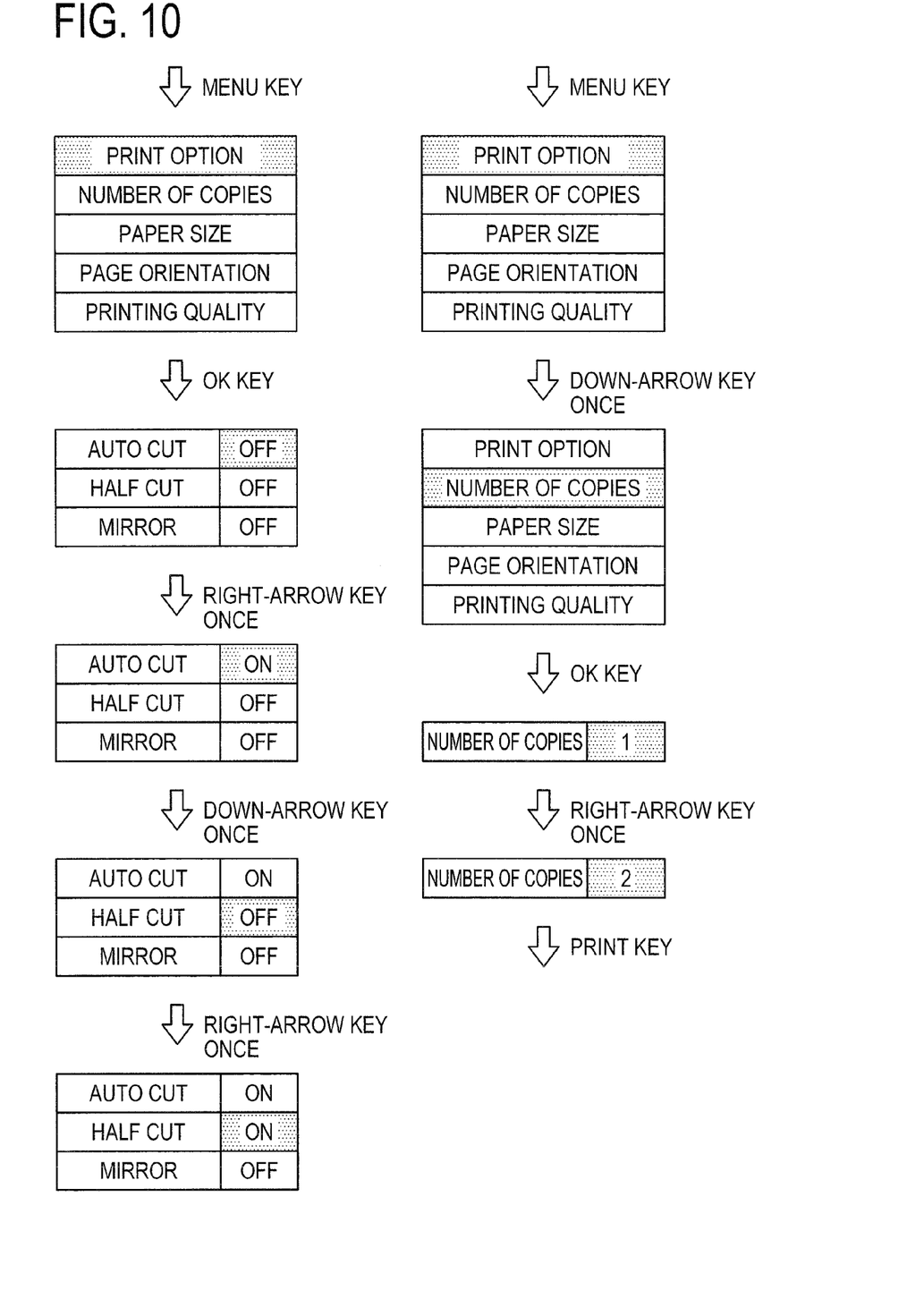
FIG. 10 is a pattern diagram showing an image transition process on a display screen of the printing apparatus as an example of executing each instruction by each input operation in sequence, or as an example of executing each operation command in sequence.

Next, based on FIG. 5, there will be explained the "other key" process in S8. First, in S31, after the operation record flag is read from the RAM 66, it is judged whether or not the operation record flag is set to ON. In case an operation record start process is not yet executed or in case an operation record terminate process to be described later has already been executed, the operation record flag is set to OFF. In that case (S31: NO), the process is proceeded to S35 for performing the original processing instructed by the key input operation in S2 originally commands. For instance, in case the menu key 4B is inputted in S2, a menu selection display for optionally setting five items such as "print option" etc. as shown at the upper left of FIG. 10 is displayed on the LCD 27 with the cursor flickering at the "print option." Then, the process is returned to S2 for waiting for a next key input (see FIG. 3).

On the other hand, in case the operation record terminate process is not yet executed while the operation record start process has been executed, the operation record flag is judged to be set to ON in S31. In that case (S31: YES), the process is proceeded to S32 for obtaining a key code allocated to the key inputted in S2. For instance, in case the menu key 4B has been inputted in S2, key code "12" shall be obtained.

Next, in S33, the key code obtained in S32 is converted into an operation command that is represented by a character string command. For instance, a character string command to be converted from key code "12" shall be "@MENU." Next, in S34, the operation command converted in S33 is added to the end of the command record buffer 66B. Thereafter, in S35, the original instruction of the key input operation in S2 is executed. Then, the process is proceeded to S2 for waiting for a next key input (see FIG. 3).

Next, based on FIG. 6, there will be explained the operation record terminate process (see FIG. 3) in S10. After read from the RAM 66 in S41, the operation record flag is reset from ON to OFF and stored on the RAM 66 again. Then, the process is returned to S2 for waiting for a next key input operation (see FIG. 3).

Figure 7:
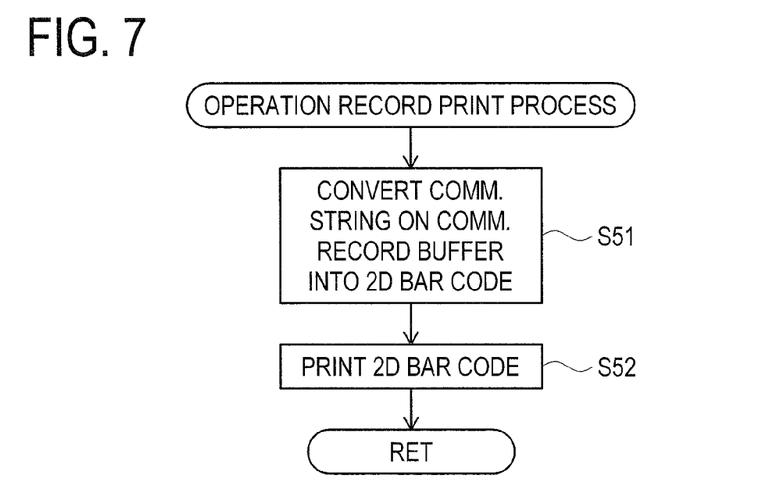
FIG. 7 is a flowchart of an operation record print process for converting the recorded operation command string into a bar code and printing the bar code.

Next, based on FIG. 7, there will be explained the operation print process (see FIG. 3) in S11. First, in S51, the operation command string consisting of a command character string stored on the command record buffer 66B is converted into two-dimensional bar code data and then stored on the RAM 66. Next, in S52, by driving of the driving circuits 71 and 73, the platen roller (not shown) and the thermal head 31 work together so as to print a two-dimensional bar code based on the two-dimensional bar code data stored on the RAM 66 in S51. Thereafter, the process is returned to S2 for waiting for a next key input operation (see FIG. 3).

Figure 8:
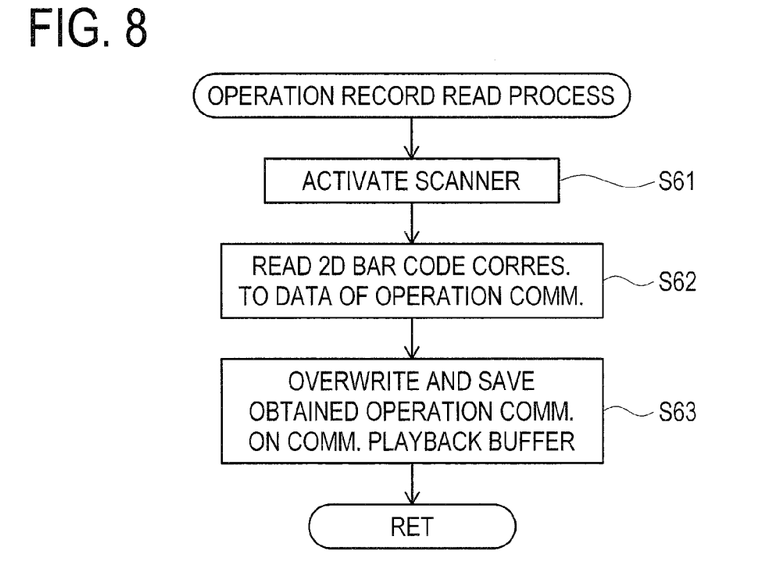
FIG. 8 is a flowchart of an operation command read process for reading the operation command string from the bar code.

Next, based on the FIG. 8, there will be explained the operation record read process in S12 (see FIG. 3). First, in S61, the bar code scanner 7 is activated. In S62, the two-dimensional bar code printed in S52 is read by the bar code scanner 7 and decoded into an operation command string consisting of character string commands. In S63, the operation command string as decoded in S62 is overwritten and saved on the command playback buffer 66C. Thereafter, the process is returned to S2 for waiting for a next key input operation (see FIG. 3.)

Figure 9:
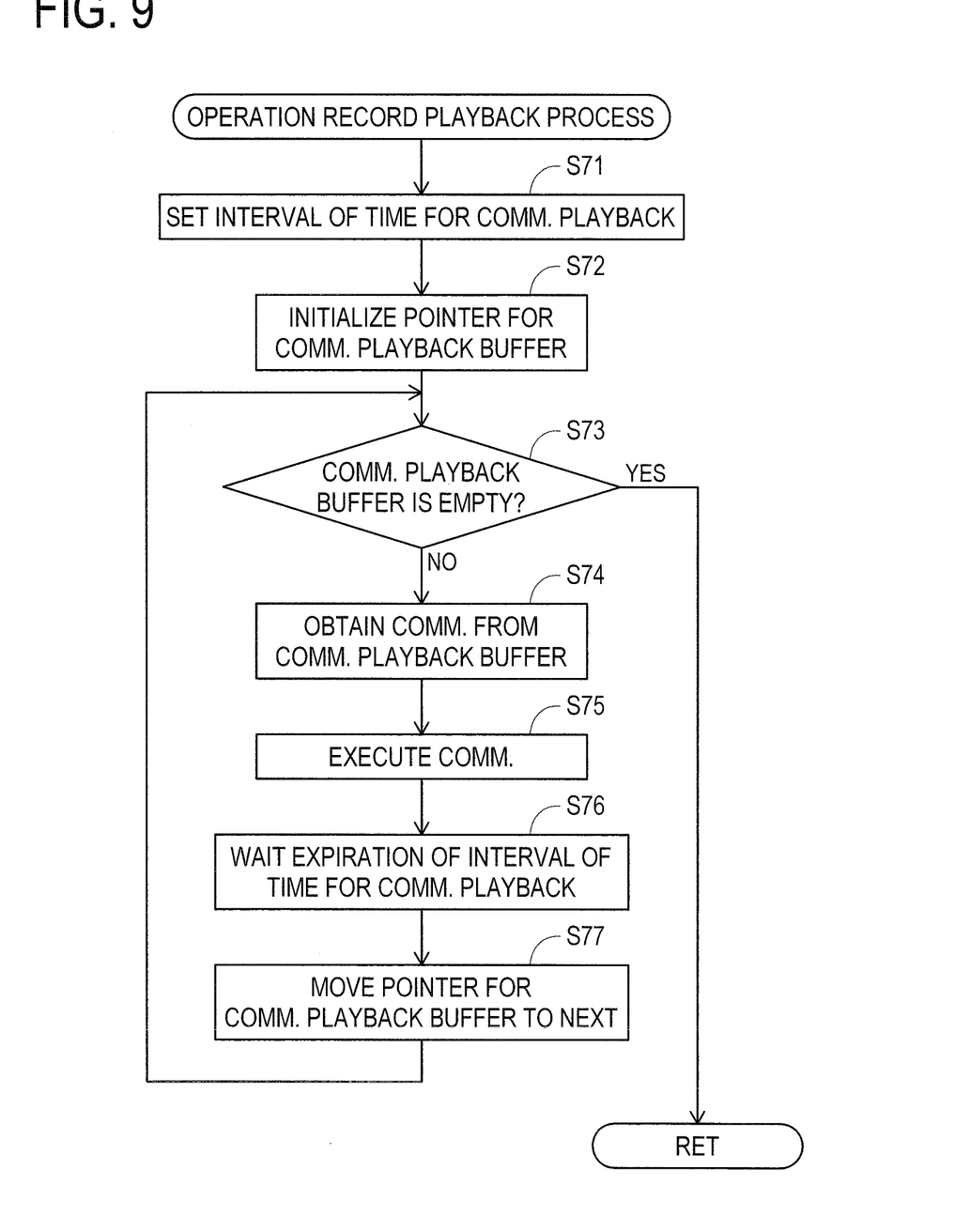
FIG. 9 is a flowchart of an operation command playback process for executing each operation command.

Next, based on FIG. 9, there will be explained the operation record playback process in S13 (see FIG. 3.) First, in S71, a request to set interval of time for executing each operation command is made by an operator through display indication on LCD27. In response, the operator sets desired interval of time by key input or the like (For instance, three seconds or five seconds, etc.) Next, in S72, a pointer n for the command playback buffer 66C is initialized to 0, the pointer n specifying a position of each operation command in an operation command string record on the command playback buffer 66C. This initialization enables the pointer n for the command playback buffer 66C to point the beginning position of the operation command string, namely, the position of the initialization command.

Next, in S73, it is judged whether the command playback buffer 66C is empty, in other words, whether any operation command is recorded in the position pointed by the pointer n for the command playback buffer 66C. In case no operation command is recorded in the position pointed by the pointer n for the command playback buffer 66C (S73: YES), the process is returned to S2 for waiting for a next key operation (see FIG. 3). On the other hand, any operation command is recorded in the position pointed by the pointer n for command playback buffer (S73: NO), the process is proceeded to S74. That is to say, a single operation command pointed by the pointer n is obtained from the command playback buffer 66C. Next, in S75, the operation command as obtained in S74 is executed. In case the pointer n for the command playback buffer 66C is 0 in S74, an initialization command is executed in S75. That is to say, an initialization process is carried out for executing the next operation command. Further, in S76, there is waited for passage of the interval of time as set in S71 while counting with the timer 81. After the interval of time mentioned above passes in S76, in S77, "1" is added to the pointer n for the command playback buffer 66C and the resultant value is stored again in the RAM 66. Thereafter, in S73 again, it is judged whether any operation command is recorded in the position pointed by the pointer n for the command playback buffer 66C. In case an operation command is recorded in the position pointed by the pointer n for the command playback buffer 66C (S73: NO), S74 and subsequent steps are repeated to execute a next command.

Next, by referring to FIG. 10, there will be described in detail, specifically how an operation to be done by the printing apparatus 1 is recorded, printed, etc through the processing as described with FIG. 3 through FIG. 9. In the example below, the printing apparatus 1 is made to record a sequence of input operations for commanding to perform a sequence of processing such as "setting the print option to automatic cut ON and half cut ON, and setting the number of copies to 2 sheets, and printing". Then the printing apparatus 1 is made to print the bar code and thereafter read the bar code.

First, an operator inputs a key for instructing to start an operation record mentioned above. Then, the operation record start process is performed to set the operation record flag to ON (see S21 of FIG. 4). The operator thereafter makes the printing apparatus 1 record the sequence of input operations below by repeating input of "other key". The "other key" process in S8 is repeated every time key input is operated. As an original processing is performed according to each of the key instructions, the indication of the LCD 27 shifts in every key input as shown in FIG. 10 to carry out actual printing (see S35 of FIG. 5).

To be specific, input the menu key 4B for instructing to indicate the setting menu for following five items: "print option"; "number of copies"; "page size"; "page orientation"; and "printing quality". As shown on the screen at the upper left of FIG. 10, while the cursor is flickering at "print option", the OK key 4C is inputted for instructing to select the item "print option". Then, the screen of the LCD 27 shifts from indication of the five items to that of three items "automatic cut", "half cut" and "mirror." Next, the right-arrow key 4I is inputted once for instructing to change the setting of the "automatic cut" from "OFF" to "ON". Thereafter, the down-arrow key 4G is inputted for instructing to move down the "half cut", the setting item listed immediately below the "auto cut". Next, the right-arrow key 4I is inputted for instructing to change the setting of "half cut" from "OFF" to "ON." Subsequently, the menu key 4B is inputted for instructing to indicate the setting menu. Thereafter, the down-arrow key 4G, the OK key 4C and the right-arrow key 4I are inputted in this order for instructing to set the "number of copies" to 2 sheets. At last, the print key 4A is inputted to carry out printing as set above.

By the sequence of key input operations mentioned above, the key codes for respective keys are converted into their respective corresponding operation commands. The operation commands are linked together on the command record buffer 66B so as to generate a single operation command string. Specifically, the operation commands "@INIT", "@MENU", "@OK", "@RIGHT", "@DOWN", "@RIGHT", "@MENU", "@DOWN", "@OK", "@RIGHT" and "@PRINT" are linked together so as to generate a single operation command string: "@INIT@MENU@OK@RIGHT@DOWN@RIGHT @MENU@DOWN@OK@RIGHT@PRINT" (see FIGS. 3 and 5).

Figure 6:
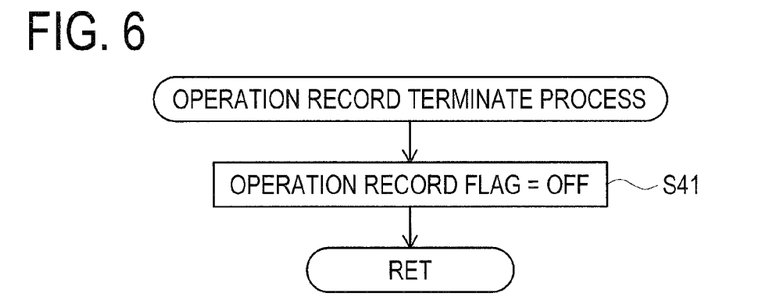
FIG. 6 is a flowchart of an operation record terminate process for terminating the generation and record of the operation command string.

Thereafter, the operator operates key input for instructing to terminate the operation record so as to execute the operation record terminate process in S10 (see FIGS. 3 and 6). Further, the operator operates key input for instructing to print the operation record. Then, through the execution of the operation record print process in S11, the above operation command string "@INIT@MENU@OK@RIGHT @DOWN@RIGHT@MENU@DOWN@OK@RIGHT @PRINT" is converted into a bar code and the bar code is printed (see FIGS. 3 and 7). Further, after the operator operates key input for instructing to read the operation record, the bar code scanner 7 reads the bar code. Thereby, the operation command string "@INIT@MENU@OK@RIGHT @DOWN@RIGHT@MENU@DOWN@OK@RIGHT @PRINT" is recorded on the command playback buffer 66C (see FIGS. 3 and 8).

Next, key input for instructing to playback the operation record is operated for performing the operation record playback process of S13. In S71, by setting an interval of time for playing back each operation command to be executed, each of the operation commands, "@INIT", "@MENU", "@OK", "@RIGHT", "@DOWN", "@RIGHT", "@MENU", "@DOWN", "@OK", "@RIGHT" and "@PRINT" is executed in order at a desired interval of time (see FIGS. 3 and 9). For instance, if the interval of time as set in S71 shall be a predetermined length (for instance, three or five seconds, etc.), each operation command is executed in order every predetermined interval of time as set above. Accordingly, indication of screen of the LCD 27 also shifts every predetermined interval of time as set above.

As explained in detail above, in the printing apparatus 1 according to the present embodiment, operation commands corresponding to respective input operations are linked together for generating a single operation command string to be recorded on the command record buffer 66B from a sequence of operation commands. Therefore, even if the input operations are complicated, a sequence of the input operations can be recorded as a single operation command string. The operation command string is converted into a two-dimensional bar code for printing. Data capacity of a two-dimensional bar code is significantly larger than data amount of an operation command string. Therefore, even if an operation command string is comparatively long, the operation command string corresponding to the sequence of input operations can be printed as a single bar code. Thereby, the bar code is easy to handle. Thus, as long as command information according to a sequence of input operations is read from a printed two-dimensional bar code for executing by the printing apparatus 1 or another printing apparatus of the same model, such an easy operation as reading the bar code once, etc., enables the printing apparatus to properly operate in accordance with the instruction of the sequence of input operations. Therefore, complicated operations with the printing apparatus are made easy for reducing operation mistakes.

Further, in the printing apparatus 1, the RAM 66 stores the operation record flag for determining whether or not to generate an operation command string. In case the operation record flag is set to ON, an operation command string is generated. In case of OFF, no operation command string is generated. Key input operations includes an instruction to start operation record for setting the operation record flag to ON and an instruction to terminate the operation record for setting the operation record flag to OFF. Consequently, after the key input operation for instructing to start the operation record, the operator operates a desired key input and ends up a sequence of operation with the key input operation for instructing to terminate the operation record. This allows more latitude in operating to generate and record an operation command string by a key input operation. For instance, it is possible to create a bar code for only a part of a long operation step or to divide a long operation step in two or more for printing separate bar codes. For instance, the operation command string explained in FIG. 10 "@INIT@MENU@OK @RIGHT@DOWN@RIGHT@MENU@DOWN@OK @RIGHT@PRINT" can be divided in two bar codes; one, data of which is based on "@INIT@MENU@OK @RIGHT@DOWN @RIGHT", and the other, data of which is based on "@INIT@MENU@DOWN@OK@RIGHT @PRINT".

Further, in the printing apparatus 1, an operation command string is read from a two-dimensional bar code by the bar code scanner 7, and then the operation command string thus obtained is executed by the CPU 62 etc. Therefore, even if a sequence of input operations by which the operation command string is created is complicated, such an easy operation as reading the bar code once, etc., enables the printing apparatus 1 to properly operate in accordance with the instruction of the sequence of input operations. Therefore, complicated operations of the printing apparatus are reliably made easy for reducing operation mistakes. Further, each operation command of the operation command string is executed not at once, but in order, which is convenient to plainly explain customers how the printing apparatus 1 works in response to each operation in a demo at a shop, etc.

Further, in the printing apparatus 1, the CPU 62, the ROM 64 and the RAM 66 etc. set an interval of time for executing each operation command etc. If using the printing apparatus 1 for a demo, an operator would make the printing apparatus 1 perform each operation corresponding to each operation command at a desired interval of time for further convenience of explaining the functions thereof.

Further, in the printing apparatus 1, when a single operation command string is generated from a sequence of input operations, instructions of the input operations are executed in order. Therefore, an operator can recognize by himself/herself what kind of instructions directed to the input operations he/she is going to put to a bar code print at the stage where the operation command string is generated. This enables the operator to easily handle two-dimensional bar codes as printed thereafter, etc.

While presently exemplary embodiments of the present disclosure have been shown and described, it is to be understood that this disclosure is for the purpose of illustration and that various changes and modifications may be made without departing from the scope of the disclosure as set forth in the appended claims. For instance, in the present embodiment, one and the same printing apparatus performs both the process from the record of input operations to the printing of a bar code and the process of reading the printed bar code. However, the latter process may be performed by another printing apparatus of the same model that includes a bar code reader.

Further, in the present embodiment, when the operation record flag is set to ON for generating or recording a new operation command string, the command record buffer is initialized. In consequence, a plurality of operation command strings are not stored in the command record buffer. However, an operation command string may be stored also on a flash memory or the like so that plural of operation command strings can be stored in the printing apparatus 1 even if the command record buffer has been initialized. Thus, when a key input for instructing to print operation record is operated, an arbitrary operation command string among the plurality of operation command strings thus stored may be selected for conversion into bar code data. Further, in the present embodiment, the interval of time for executing each operation command of an operation command string is set immediately before the execution of the operation command string. However, at the stage where an operation command string is generated from input operations, each interval of time between input operations may be measured so as to print information of the interval of time with the operation command string into a bar code, for instance. Then, there may be configured such that each operation command is executed at each interval of time based on the information read along with the operation command string from the bar code. Further, in the present embodiment, character data is used as operation command. However, there may be configured such that a numerical sequence consisting of a plurality of key codes is stored as operation command string and converted into a bar code for printing, or such that the key code data is decoded from the bar code data for performing each process based thereon. Further, the bar code scanner may be connected externally to the main body of a printing apparatus like the present embodiment or may be housed in a printing apparatus.

What is claimed is:

1. A printer comprising:
   a printer unit configured to print a bar code based on bar code data;
   an input unit configured to input input operations;
   a data generator unit configured to generate an operation command string from a sequence of input operations by linking together operation commands each corresponding to an input operation through the input unit, the operation commands being used to control operations of the printer;
   a data recorder unit configured to record the operation command string generated by the data generator unit; and
   a bar-code-converter unit configured to convert the operation command string recorded by the data recorder unit into two-dimensional bar code data,
   wherein the printer unit is configured to print a bar code based on the two-dimensional bar code data created by the bar-code-converter unit,
   wherein the printer further comprises:
     a reader unit configured to read the operation command string from the bar code printed by the printer unit; and
     an executor unit configured to execute in order the operation commands of the operation command string read by the reader unit.

2. The printer according to claim 1,
   wherein the data generator unit has a mode for determining whether or not to generate the operation command string,
   wherein, in case the mode is set to ON, the operation command string is generated and in case the mode is set to OFF, the operation command string is not generated, and wherein an instruction to set the mode to ON and an instruction to set the mode to OFF are instructions inputted with the input unit.

3. The printer according to claim 1 further comprising a time setting unit that sets an interval of time for executing each of the operation commands,
wherein the executor unit executes each of the operation commands at the interval of time set by the time setting unit.

4. The printer according to claim 1,
wherein, when the data generator unit generates the operation command string from the sequence of input operations, instructions of the input operations are executed in order.

5. A method for controlling a printer comprising:
inputting an input operation;
generating an operation command string from a sequence of input operations by linking together operation commands each corresponding to an input operations in the inputting step, the operation commands being used to control operations of the printer;
recording the operation command string generated in the generating step; and
converting the operation command string recorded in the recording step into two-dimensional bar code data;
printing a bar code based on the two dimensional bar code data generated in the bar code converting step;
reading the operation command string from the printed bar code; and
controlling the printer in accordance with the operation commands of the operation command string by executing the operation commands of the operation command string in order.

* * * * *